US007656901B2

(12) United States Patent
Strutt et al.

(10) Patent No.: US 7,656,901 B2
(45) Date of Patent: Feb. 2, 2010

(54) SOFTWARE ARCHITECTURE AND HARDWARE ABSTRACTION LAYER FOR MULTI-RADIO ROUTING AND METHOD FOR PROVIDING THE SAME

(75) Inventors: Guenael T. Strutt, Sanford, FL (US); Charles R. Barker, Jr., Orlando, FL (US); William Vann Hasty, Jr., Lake Mary, FL (US); Avinash Joshi, Orlando, FL (US); Sebnem Z. Ozer, Altamonte Springs, FL (US)

(73) Assignee: MeshNetworks, Inc., Maitland, FL (US)

( * ) Notice: Subject to any disclaimer, the term of this patent is extended or adjusted under 35 U.S.C. 154(b) by 321 days.

(21) Appl. No.: 11/200,658

(22) Filed: Aug. 10, 2005

(65) Prior Publication Data
US 2006/0034233 A1 Feb. 16, 2006

Related U.S. Application Data

(60) Provisional application No. 60/600,413, filed on Aug. 10, 2004.

(51) Int. Cl.
*H04J 3/16* (2006.01)
(52) U.S. Cl. .................. 370/469; 370/338; 709/231
(58) Field of Classification Search .......... 370/338, 370/469, 241, 328, 347, 217, 447, 255, 235, 370/351, 331, 356, 409, 392; 455/422.1, 455/424, 450, 414, 515

See application file for complete search history.

(56) References Cited

U.S. PATENT DOCUMENTS

| | | | | | |
|---|---|---|---|---|---|
| 5,231,634 A | * | 7/1993 | Giles et al. | .................. | 370/348 |
| 5,233,604 A | * | 8/1993 | Ahmadi et al. | .............. | 370/238 |
| 5,459,455 A | * | 10/1995 | Sato | .......................... | 370/410 |

(Continued)

FOREIGN PATENT DOCUMENTS

WO 2004028057 A1 4/2004

(Continued)

OTHER PUBLICATIONS

U.S. Appl. No. 11/138,241, filed May 24, 2005, Guenael Strutt.

(Continued)

*Primary Examiner*—Tan Trinh
(74) *Attorney, Agent, or Firm*—Randi L. Karpinia; Joseph J. Buczynski

(57) ABSTRACT

A system and method that creates an abstraction of the physical layer of a wireless communication network (100), in particular, a wireless ad-hoc peer-to-peer communication network (100), and that normalizes the feedback from the physical layer to enable multiple types of nodes (102, 106, 107) in the wireless network to operate using a common wireless routing protocol. This routing protocol uses a link quality metric to determine the best route regardless of how it actually chooses the route or disseminates such link quality information. The generalized routing metric can be derived for any node (102, 106, 107), regardless of its relative performance or its media access control (MAC) technology. The system and method also create a transaction summary that can be used for link adaptation and link quality estimation to determine, for example, future data rates, link quality/routing metrics, and transmit powers.

20 Claims, 8 Drawing Sheets

U.S. PATENT DOCUMENTS

| | | | |
|---|---|---|---|
| 5,999,517 A * | 12/1999 | Koning et al. | 370/255 |
| 6,807,165 B2 | 10/2004 | Belcea | |
| 6,873,839 B2 | 3/2005 | Stanforth | |
| 2002/0058502 A1 | 5/2002 | Stanforth | |
| 2002/0082014 A1* | 6/2002 | Andersson et al. | 455/436 |
| 2002/0101880 A1* | 8/2002 | Kim | 370/465 |
| 2003/0107998 A1 | 6/2003 | Mowery | |
| 2003/0134622 A1* | 7/2003 | Hsu et al. | 455/414 |
| 2003/0161268 A1 | 8/2003 | Larsson | |
| 2003/0177275 A1 | 9/2003 | Lind | |
| 2004/0013120 A1 | 1/2004 | Shen | |
| 2004/0047314 A1 | 3/2004 | Li | |
| 2004/0125779 A1* | 7/2004 | Kelton et al. | 370/338 |
| 2004/0146007 A1* | 7/2004 | Saadawi et al. | 370/238 |
| 2004/0199576 A1* | 10/2004 | Tan | 709/203 |
| 2004/0219909 A1* | 11/2004 | Kennedy et al. | 455/422.1 |
| 2004/0260808 A1 | 12/2004 | Strutt | |
| 2005/0005190 A1* | 1/2005 | Ofir et al. | 714/4 |
| 2005/0102292 A1* | 5/2005 | Tamayo et al. | 707/10 |
| 2005/0108518 A1* | 5/2005 | Pandya | 713/151 |
| 2005/0157733 A1* | 7/2005 | Liu et al. | 370/401 |
| 2005/0249122 A1* | 11/2005 | Wheeler et al. | 370/241 |
| 2005/0259571 A1* | 11/2005 | Battou | 370/217 |
| 2005/0286440 A1 | 12/2005 | Strutt | |
| 2006/0026305 A1* | 2/2006 | Illowsky et al. | 710/8 |
| 2006/0080455 A1* | 4/2006 | Das et al. | 709/231 |
| 2008/0077814 A1* | 3/2008 | Cherukuri et al. | 713/320 |

FOREIGN PATENT DOCUMENTS

| | | | |
|---|---|---|---|
| WO | WO 2004028057 | * | 4/2004 |

OTHER PUBLICATIONS

C. Perkins, et al., "Ad Hoc On-Demand Distance Vector (AODV) Routing," RFC 3561, http://www.ietf.org/rfc/rfc3561.txt, Jul. 2003.

T. Clausen, et al., "Optimized Link State Routing Protocol (OLSR)," RFC 3626, http://www.ietf.org/rfc/rfc3626.txt, Oct. 2003.

R. Ogier, et al., "Topology Dissemination Based on Reverse-Path Forwarding (TBRPF)," RFC 3684, http://www.ietf.org/rfc/rfc3684.txt, Feb. 2004.

D. DeCouto, et al., "A High-Throughput Path Metric for Multi-Hop Wireless Routing," 9th ACM Intern'l Conf. on Mobile Computing and Networking, San Diego, CA, Sep. 2003.

PCT/US05/028623 - International Search Report mailed Jan. 30 2006 - 9 pages.

* cited by examiner

SOFTWARE ARCHITECTURE AND HARDWARE ABSTRACTION LAYER FOR MULTI-RADIO ROUTING AND METHOD FOR PROVIDING THE SAME

This application claims the benefit of U.S. Provisional Application No. 60/600,413, filed Aug. 10, 2004, the entire content being incorporated herein by reference.

FIELD OF THE INVENTION

The present invention in general relates to wireless communication networks, and in particular, to wireless ad-hoc peer-to-peer communication networks that normalize the feedback from the physical layer to enable multiple types of radios in the wireless network to operate using a common wireless routing protocol.

BACKGROUND

In recent years, a type of mobile communications network known as an "ad-hoc" network has been developed. In this type of network, each mobile node is capable of operating as a base station or router for the other mobile nodes, thus eliminating the need for a fixed infrastructure of base stations. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format. More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", issued Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", and in U.S. Pat. No. 6,873,839 entitled "Prioritized-Routing for an Ad-Hoc, Peer-to-Peer, Mobile Radio Access System", the entire content of each being incorporated herein by reference.

As can be appreciated by one skilled in the art, it would be desirable for these types of networks to be able to employ different types of radios. This can be achieved by providing an abstraction of the physical layer of the nodes in the wireless network. Abstracting the physical layer of a node that routes packets in a wireless network is beneficial because it makes it possible to run the same software on different types of radio without having to make costly adjustments every time new radios of a different type are added to the network. The abstracted physical layer also makes it possible to replace the physical/media access control (PHY/MAC) layers of a wireless network without having to upgrade the networking layer as well, and enables multiple PHY/MAC layers to operate in a wireless network concurrently in order to increase capacity, compatibility or functionality of the network. In addition, the abstract physical layer makes it possible to upgrade a wireless network by adding PHY/MAC elements while maintaining backwards-compatibility, thus ensuring a smooth transition while terminal nodes are being replaced, and also enables a heterogeneous network of nodes to operate using a variety of PHY/MAC elements. For example, a long-distance, fixed infrastructure backhaul using directional antennas would provide a certain type of connectivity using high data rate, low mobility radios while a short-distance, low data rate nodes would provide extended coverage to mobile nodes.

Accordingly, a need exists for a routing protocol in a wireless communication network, in particular, a wireless mobile ad-hoc peer-to-peer communication network, that can enable operation of multiple heterogeneous radios at the same time.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
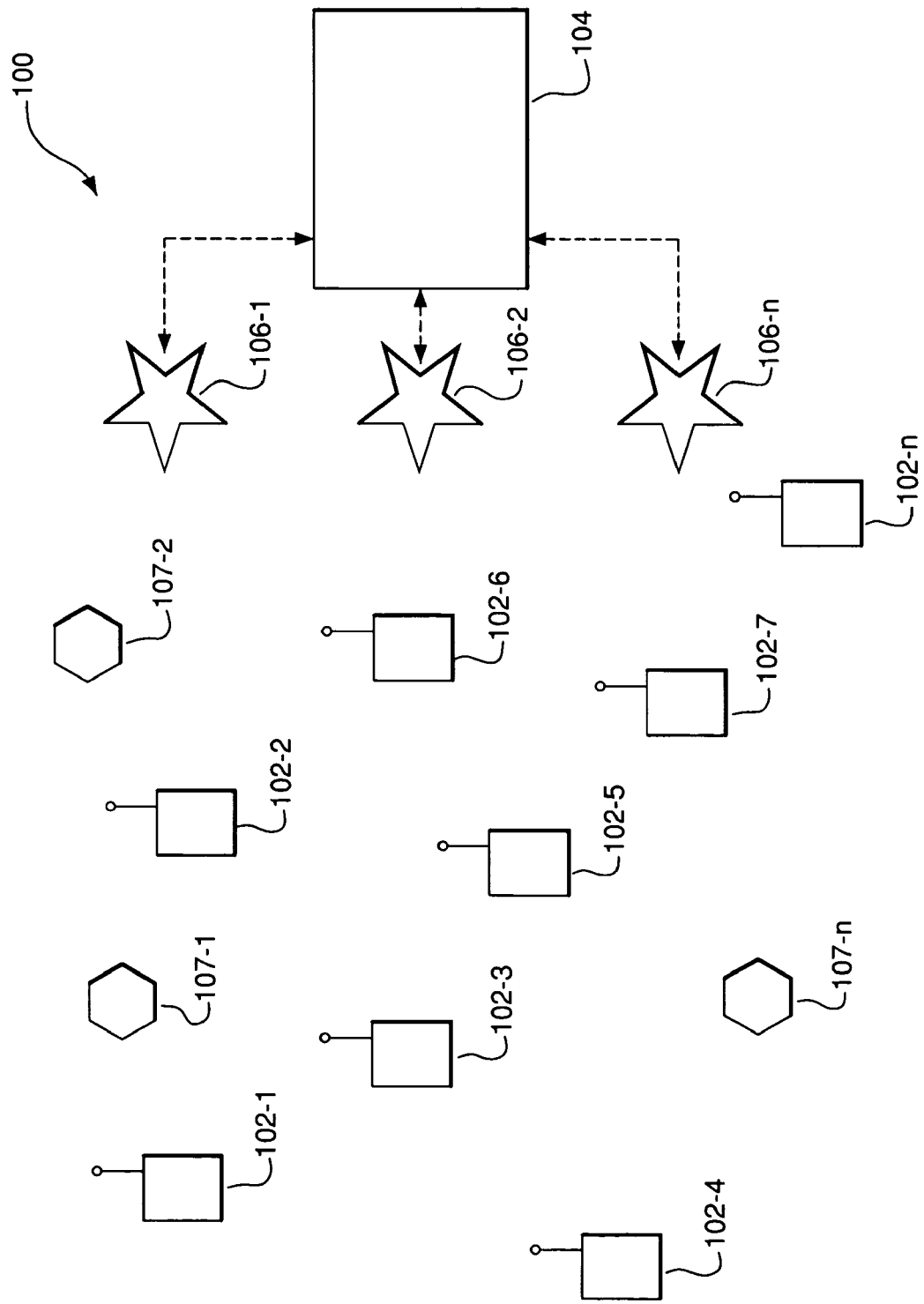
FIG. 1 is a block diagram of an example ad-hoc wireless communications network including a plurality of nodes employing a system and method in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to providing an abstraction of the physical layer of a wireless communication network, in particular, a wireless ad-hoc peer-to-peer communication network to enable multiple types of radios in the wireless network to operate using a common wireless routing protocol. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for providing an abstraction of the physical layer of a wireless communication network to enable multiple types of radios in the wireless network to operate using a common wireless routing protocol as described herein. The non-processor circuits may include, but are not limited to, a radio receiver, a radio transmitter, signal drivers, clock circuits, power source circuits, and user input devices. As such, these functions may be interpreted as steps of a method to perform operations for providing an abstraction of the physical layer of a wireless communication network to enable multiple types of radios in the wireless network to operate using a common wireless routing protocol. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As described in more detail below, the present invention provides a system and method that is capable of creating an abstraction of the physical layer of a wireless communication network, in particular, a wireless ad-hoc peer-to-peer communication network, and that normalizes the feedback from the physical layer to enable multiple types of radios, such as radio frequency (RF) terminals and the like, in the wireless network to operate using a common wireless routing protocol. This routing protocol uses a Link Quality metric to determine the best route regardless of how it actually chooses the route or disseminates such Link Quality information. The generalized routing metric can be derived for any radio, regardless of its relative performance or its MAC technology. The system and method also facilitates link adaptation, for example, data rate selection, power control and fragmentation, for any type of radio in a wireless communication network.

The hardware abstraction layer further provides a software foundation or an algorithmic framework to collect normalized statistics from the physical layer, determine the value of parameters that are specific to the physical layer being used, and use those statistics and parameters to select a route and a channel access scheme.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-$n$ (referred to generally as nodes 102 or mobile nodes 102), and can, but is not required to, include a fixed network 104 having a plurality of access points 106-1, 106-2, . . . 106-$n$ (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-$n$ (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. patent application Ser. No. 09/897,790, and in U.S. Pat. Nos. 6,807,165 and 6,873,839, referenced above.

Figure 2:
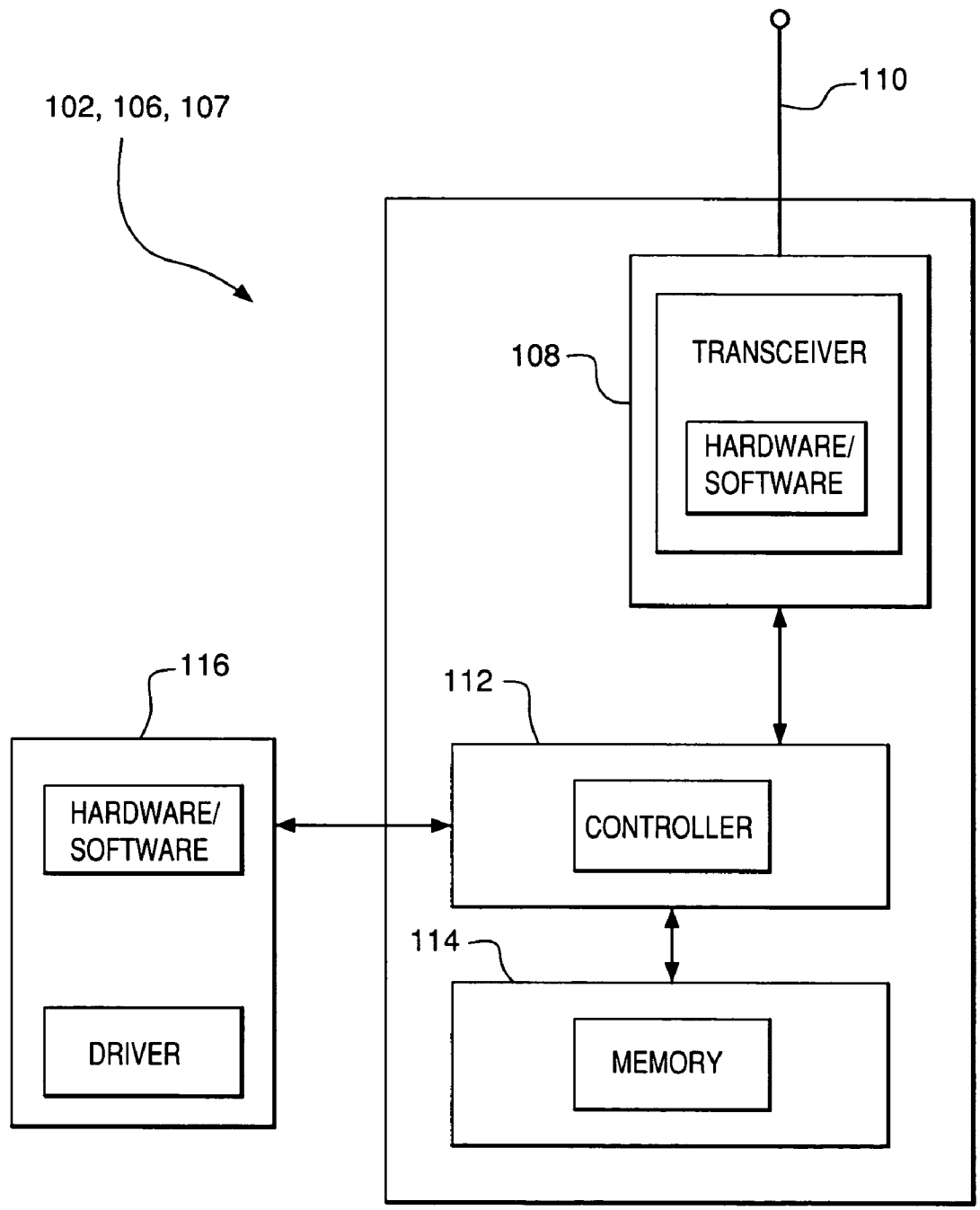
FIG. 2 is a block diagram illustrating an example of a mobile node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

Figure 3:
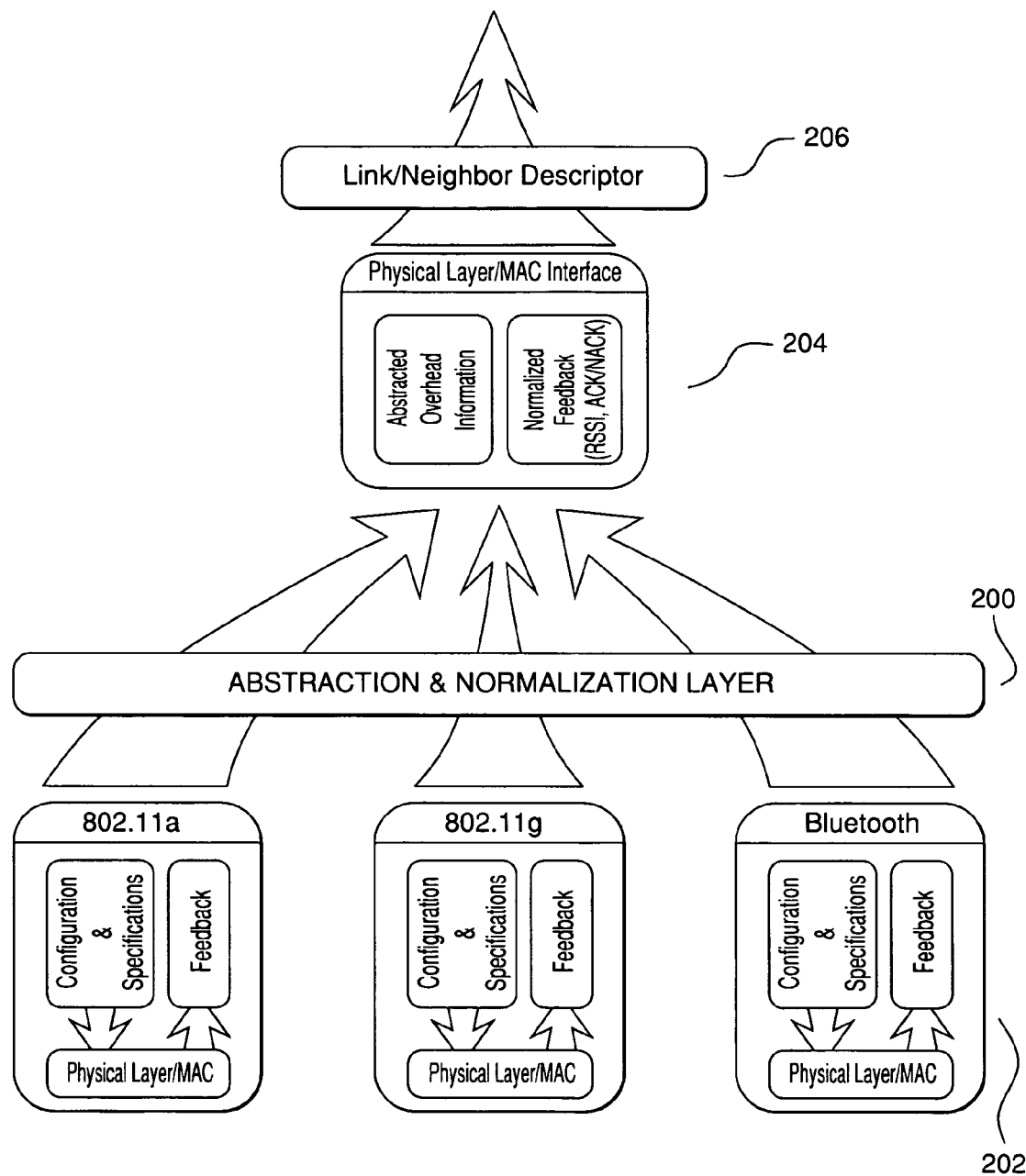
FIG. 3 is a conceptual diagram showing the functionality of the hardware abstraction and normalization layer employed in the network shown in FIG. 1 according to an embodiment of the present invention.

FIG. 3 is a diagram that shows the functionality of the hardware abstraction and normalization layer 200 employed in the network 100 shown in FIG. 1 according to an embodiment of the present invention. Specifically, FIG. 3 illustrates an example of the abstraction and normalization layer 200 in between the physical layer/media access layer (PHY/MAC) layer 202 and the routing layer 208 (see FIG. 4), and provides the Physical Layer/MAC Interface information 204 and the Link/Neighbor Descriptor information 206 to the routing layer 208. It is noted that the PHY/MAC layer 202 can alternatively be referred to as the MAC/PHY layer. Data also flows back towards the PHY/MAC layer 202, for example, when the data rate or the transmit power are selected. Each exemplified PHY/MAC layer 202, such as the 802.11a and 802.11g type layers and Bluetooth layer exemplified in this figure, has specific characteristics such as length of request to send messages (RTSs), data rates, packet failure penalty, slot interval, duty cycle and so on, as well as specific configurations such as no RTS sent for small packets and so on, and specific feedback characteristics, such as the number of retries, received signal strength, number of time slots allocated, and so on. All of those parameters are translated into information that can be interpreted by the routing layer 208. This information is provided by, for example, the transaction summary and the overhead table that is discussed in more detail below.

Figure 4:
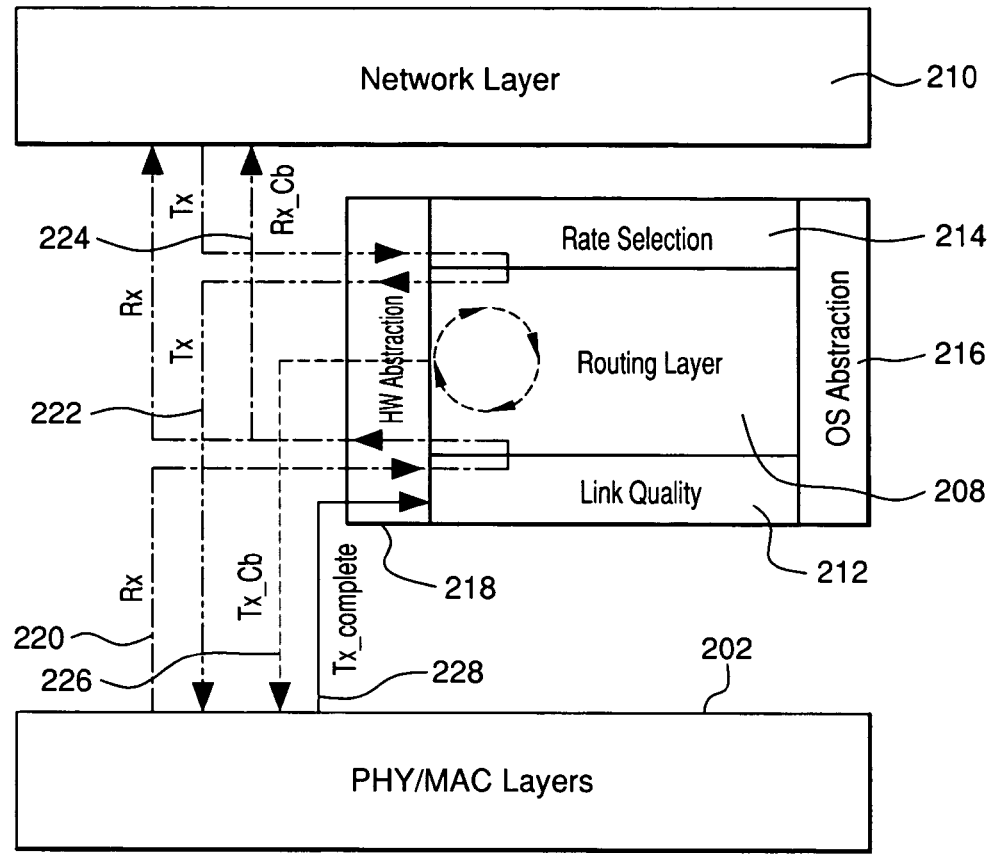
FIG. 4 is a conceptual diagram illustrating an example of integration between the PHY/MAC layer and the routing layer according to an embodiment of the present invention.

A further example of integration between the PHY/MAC layer 202 and the routing layer 208 is shown in FIG. 4 and is facilitated by the use of three distinct events, namely, a transmission request when data needs to be transmitted, transmission completion when transmission has succeeded or failed, and reception when data has been received by a node, such as node 102, 106 or 107 discussed above with regard to FIG. 1. It is not necessary that this architecture totally integrate the different layers but rather, it is sufficient for purposes of the embodiments of the present invention described herein that the architecture partially integrates the different layers in such a way as to be operable in all circumstances. Also, this architecture does not assume that a particular type of layer is being used, such as an orthogonal frequency division multiplexing (OFDM) or (frequency hopping spread spectrum (FHSS) radio, a carrier sense multiple access (CSMA) or time-division multiple access media access control (TDMA MAC), or an ad-hoc on-demand distance vector (AODV) or data signaling rate (DSR) routing protocol, but rather enables the layers to work together, with some degree of flexibility. The architecture also provides the ability for the tuning of key parameters, such as target completion rates or signal to noise ratios (SNRs).

As indicted, the architecture integrates the PHY/MAC layer 202 with the routing layer 208 and network layer 210 using an operating system (OS) abstraction layer 216 and a hardware abstraction layer 218, which can consider criteria in routing libraries such as a link quality library 212 and rate selection library 214, for example. As indicated in this example, a transmission (Tx) 222 from the network layer 210 to the PHY/MAC Layer 202 can occur via the hardware abstraction layer 218 in cooperation with the routing layer 208 and information taken from the routing layer libraries, such as the rate selection library 214. Similarly, a receipt message (Rx) 220 indicating reception of a data frame can be issued by the PHY/MAC layer 202 to the network layer 210 via the hardware abstraction layer 218 in cooperation with the routing layer 208 and the link quality library 212. A transmission callback message (Tx_Cb) 226 can be issued directly by the routing layer and sent to the MAC/PHY layer for dissemination to one or more other node(s) of the network. Transmission callback messages Tx_Cb are typically messages that are used by the routing layer to build a topology database; those include hello messages, route requests, route replies, and so on, such as those employed in on-demand routing protocols. Similarly, a reception callback message Rx_Cb 224 can be issued directly by the routing layer in response to the network layer if the transmission request Tx 222 should be answered directly. Reception callback messages Rx_Cb typically include responses to network layer-specific packets such as ARP (Address Resolution Protocol) if the routing protocol is intended to provide such responses (otherwise the routing protocol can deliver the network layer-specific packets to the MAC/PHY layer). A transmission complete message Tx_complete 228 is sent from the MAC/PHY layer to the Link Quality module, as indicated. This allows for the Link Quality module to measure the performance of various data communication links at the MAC/PHY layer. The transmission complete (Tx_complete) message 228 and the reception (Rx) message 220 can be accompanied by the transaction summary, which is described below.

The hardware abstraction layer 218 further allows for the utilization of all the routing libraries independently of the type of the PHY/MAC layer 202. In other words, the routing libraries support any type of PHY/MAC layer 202 provided that the layer can generate a small set of feedback information, such as the transmission complete message Tx_complete 228 and a receive message Rx 220 discussed above. The routing libraries can reside in an intermediate layer above the PHY/MAC layer 202 and below the Internet Protocol (IP) layer (not shown). The routing layer 208 intercepts ingress data packets to the local stack and egress packets to the PHY/MAC layer 202. In addition to packet interception, the routing libraries can source ingress and egress packets as necessary to control upper layers, lower layers, and communicate with the routing library implementations on physically separate devices.

Figure 5:
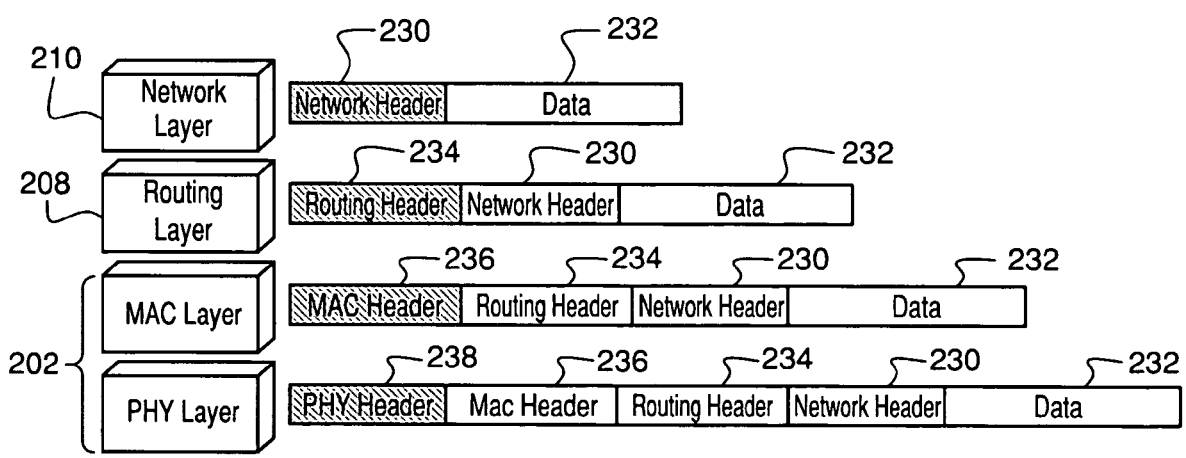
FIG. 5 is an example of the manner in which the routing layer inserts its own header between the Network and MAC layer headers in accordance with an embodiment of the present invention.

As the routing layer 208 intercepts ingress and egress traffic, the routing layer 208 removes and adds its own routing header to the data packet as shown, for example, in FIG. 5. As further indicated, the other layers also add their respective headers as traffic passes through those layers. For example, when the traffic passes through the network layer 210, the network layer 210 adds a network header 230 to the data 232. When the data packet passes through the routing layer 208, the routing layer 208 appends a routing header 234 to the network header 230 in this example. When the data packet then proceed to the PHY/MAC layer 202, the MAC layer portion appends the MAC header 236 to the routing header 234, and likewise, the PHY layer portion appends the PHY header 238 to the MAC header 236 as indicated in this example.

Further examples of the transactions discussed above are shown in the flow diagrams of FIGS. 6-10.

Figure 6:
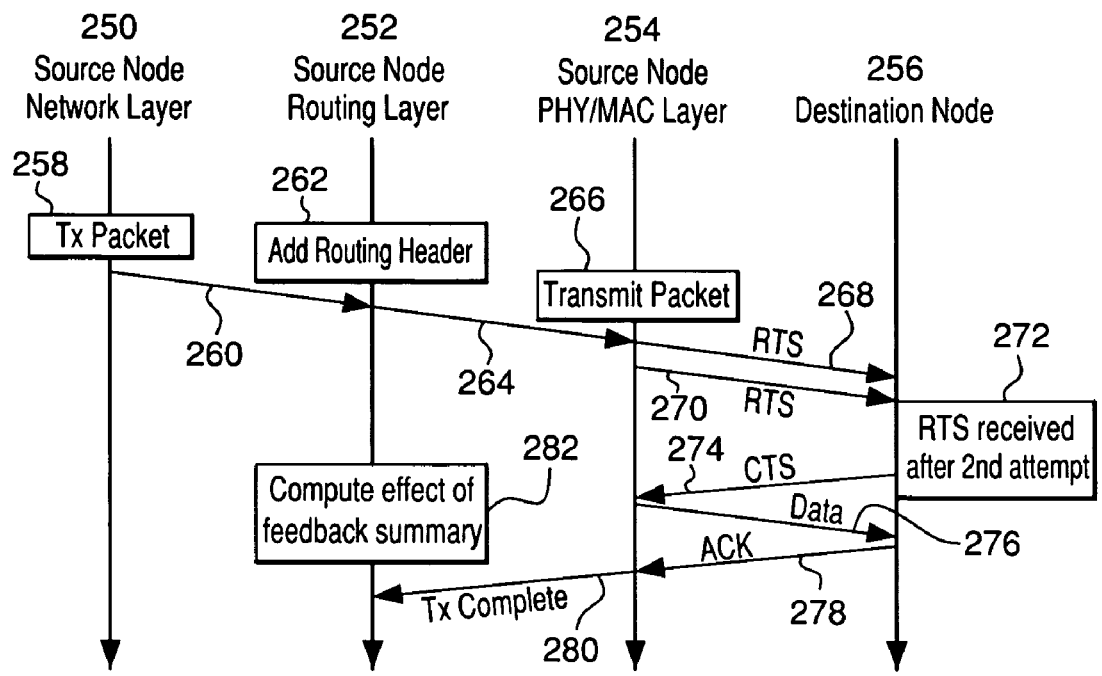
FIGS. 6-10 are flow diagrams showing examples of the transactions that occur between the Network layer, Routing layer and MAC/PHY layer of the source and destination nodes according to an embodiment of the present invention.

Specifically, FIG. 6 illustrates transmissions that occur between the network layer, routing layer and PHY/MAC layer of a source node, which can be any type of node 102, 106 or 107 as discussed above with regard to FIGS. 1 and 2, and a destination node that also can be any type of node 102, 106 and 107. As indicated, after adding routing specific headers when transmit packets are intercepted, the routing layer also receives a transmission completion indication from the MAC layer.

That is, in this example, a transmission (Tx) packet 258 is provided from the source node network layer 250 along flow direction 260 to the source node routing layer 252 at which a routing header 262 is added. The Tx packet 258 is then provided to the source node PHY/MAC layer 254 along flow direction 264 where the Tx packet is then made ready for transmission as a transmit packet 266.

As understood by one skilled in the art, to perform the transmission, a request to send (RTS) message is sent in transmission 268 to destination node 256. If no clear to send (CTS) message is sent by the destination node 256, a second attempt for transmission is made by sending another RTS message in transmission 270. After this attempt, the RTS is received by the destination node 256 as indicated in receipt transaction 272, and the destination node 256 sends a clear to send (CTS) message to the source node PHY/MAC layer 254 in transmission 274. Upon receiving the CTS message, the PHY/MAC layer 254 of the source node transmits the transmission packet to the destination node 256 in transmission 276. Upon receiving the transmission packet, the destination node 256 sends an acknowledgement message (ACK) along transmission 278 to the source node PHY/MAC layer 254. This ACK message is then passed to the source node routing layer 252 along flow direction 280, and the source node routing layer 252 computes the effect of the feedback summary message (i.e., the message indicating that the transmission has been successfully completed) on the routing layer, more specifically, the link quality library of the routing layer, in operation 282.

Figure 7:
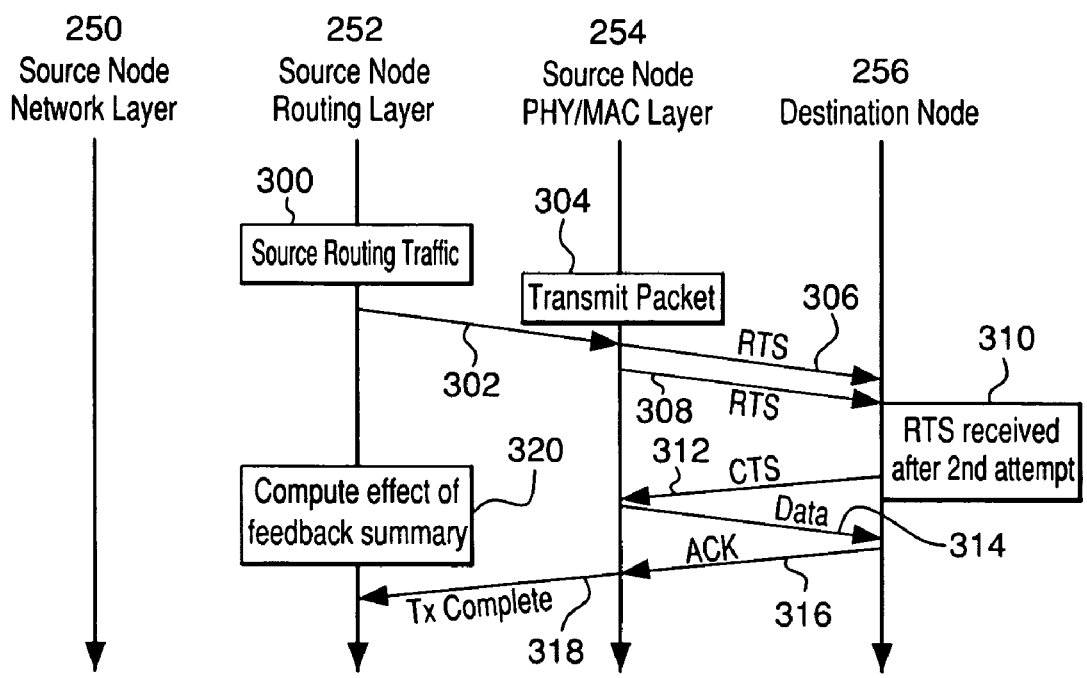

As shown in FIG. 7, the routing layer can also act as a source of traffic of its own. Specifically, as indicated in this example, the source node routing layer 252 can send source routing traffic 300 along flow path 302 to the source node PHY/MAC layer 254. This routing traffic is made ready for transmission as a transmit packet 304 at the source node, PHY/MAC layer 254.

As understood by one skilled in the art, to perform the transmission, a request to send (RTS) message is sent in transmission 306 to destination node 256. If no clear to send (CTS) message is sent by the destination node 256, a second attempt for transmission is made by sending another RTS message in transmission 308. After this attempt, the RTS is received by the destination node 256 as indicated in receipt transaction 310, and the destination node 256 sends a clear to send (CTS) message to the source node PHY/MAC layer 254 in transmission 312. Upon receiving the CTS message, the PHY/MAC layer 254 of the source node transmits the transmission packet to the destination node 256 in transmission 314. Upon receiving the transmission packet, the destination node 256 sends an acknowledgement message (ACK) along transmission 316 to the source node PHY/MAC layer 254. This ACK message is then passed to the source node routing layer 252 along flow direction 318, and the source node routing layer 252 computes the effect of the feedback summary message (i.e., the message indicating that the transmission has been successfully completed) on the routing layer, more specifically, the link quality library of the routing layer, in operation 320.

Figure 8:
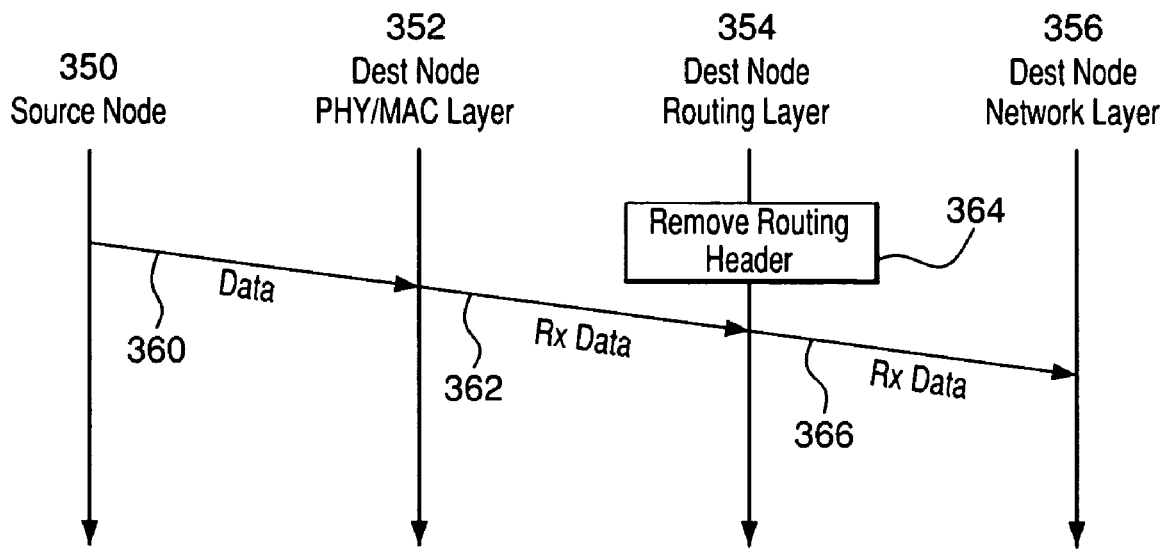

As shown in the example of FIG. 8, for traffic being received at the final destination (i.e., ingress traffic at the final destination), the routing layer will remove the routing header, process the receive feedback and pass the packet to the network layer. That is, the source node 350, which can be any type of node 102, 106 or 107 as discussed above, sends a data packet along flow path 360 to the PHY/MAC layer 352 of the destination node, which also can be any type of node 102, 106 or 107. The destination node PHY/MAC layer 352 sends the received data along flow path 362 to the destination node routing layer 354, which removes the header from the received data packet in operation 364. The received data packet is then sent along flow path 366 to the destination node network layer 356.

Figure 9:
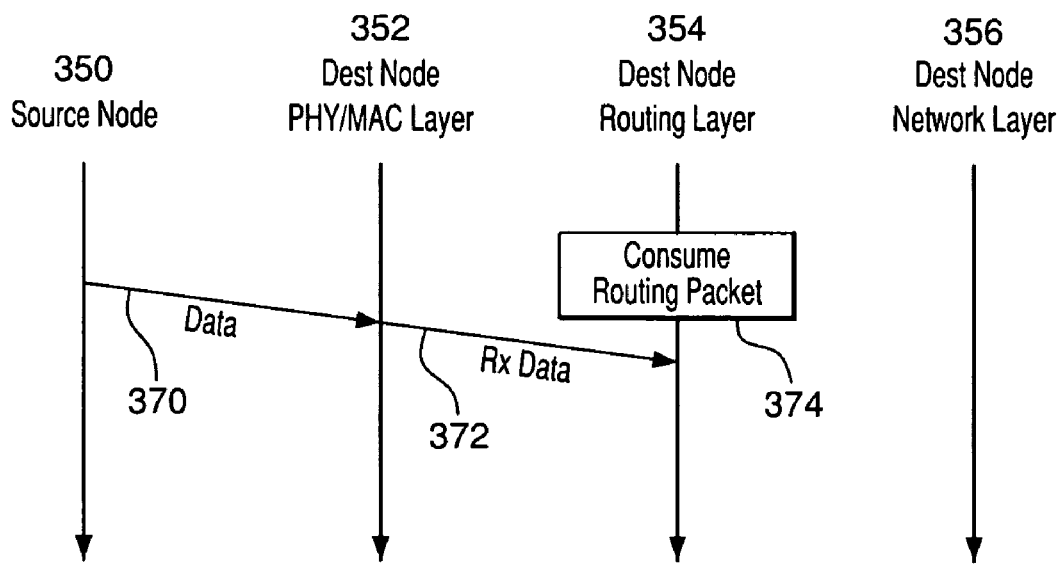

As shown in the example of FIG. 9, for ingress routing traffic that has arrived at its final destination, the routing layer will consume the received data packet. That is, when the destination node is not an intermediate node along the path but rather, the final destination for the routing packet, the destination node will act on the routing packet. As indicated, the source node 350, which can be any type of node 102, 106 or 107 as discussed above, sends a routing packet along flow path 370 to the PHY/MAC layer 352 of the destination node, which also can by any type of node 102, 106 or 107. The destination node PHY/MAC layer 352 sends the received data along flow path 372 to the destination node routing layer 354, which consumes the routing packet in operation 374.

Figure 10:
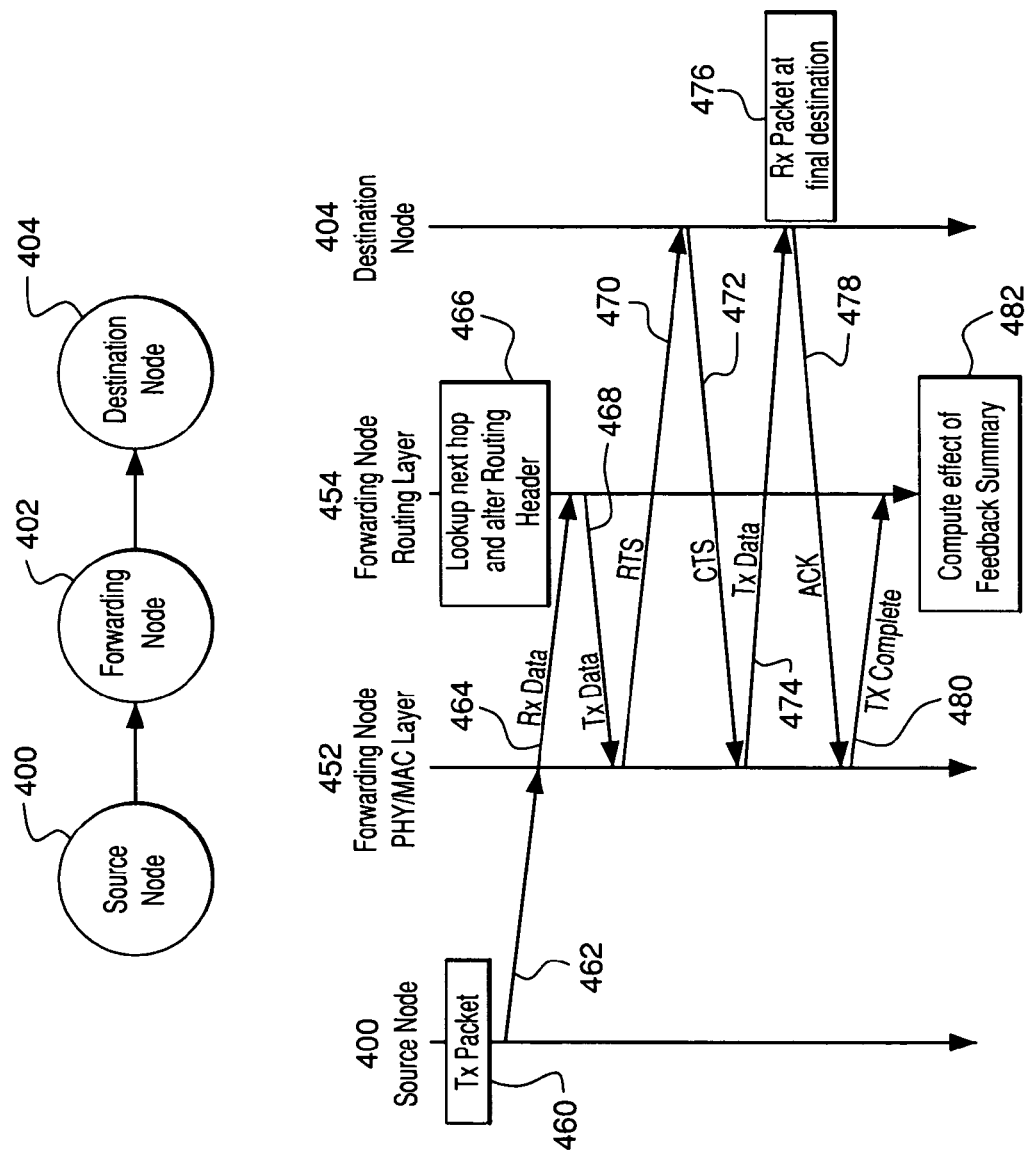

FIG. 10 illustrates an example of transactions that occur at the forwarding node, that is, an intermediate node along a path from a source node to a destination node. In this example, the source node 400 sends a data packet to a destination node 404 via an intermediate forwarding node. The source node, destination node and forwarding node can each be any type of node 102, 106 or 107 as discussed above.

As indicated, the source node 400 sends a transmission (Tx) packet 460 along transmission path 462 to the PHY/MAC layer 452 of a forwarding node. The forwarding node PHY/MAC layer 452 sends a receipt data message along flow path 464 to the forwarding node routing layer 454 which looks up the next hop node in operation 466. The forwarding node routing layer 454 sends transmit data along flow path 468 to the forwarding node PHY/MAC layer 452, which then sends an RTS message in transmission 470 to the destination node 404. In this example, destination node 404 sends a CTS message in transmission 472 that is received at the PHY/MAC layer 452 of the forwarding node. The PHY/MAC layer 452 then transmits the data packet in transmission 474 to the destination node 404, which receives the packet in operation 476 as the final destination of the data packet. The destination node 404 then sends an ACK message in transmission 478 to the forwarding node PHY/MAC layer 452, which sends a transmission complete message along flow path 480 to the forwarding node routing layer 454. The forwarding node routing layer 454 then computes the effect of the transmission in operation 482.

Overhead Information and Normalized Feedback

Details of examples of the overhead information and feedback information that is exchanged in the transactions discussed above are discussed below.

Overhead Table

In order to ensure that link adaptation algorithms and routing protocols are independent of lower-layer specificities, the data transmission overhead information can be abstracted. The data transmission overhead table comprises information pertaining to, for example, signaling time, acknowledgement (ACK) processing time, ACK time, ACK time-out, back-off time, fairness time and congestion time. The overhead information is compiled using total transmission time (for each data rate and quantized packet size) and extra transmission delays (for each data rate and quantized packet size). For link adaptation purposes, this overhead can be translated into maximum effective throughput values, which in turn can be translated into adjustment parameters. These adjustments parameters are MAC/physical layer dependent, but they are abstracted in such a way that their effect on link adaptation algorithms and routing decisions is consistent (e.g. if two MAC/physical layers provide a throughput of 500 Kbps for specific data rates and packet sizes, their adjustments values will be identical, even though the actual data rates and packet sizes are different). Note that the overhead information can be used to optimize latency instead of effective throughput.

Normalized Feedback

The second step in ensuring that link adaptation algorithms and routing decisions are independent of lower-layer specificities is to normalize the feedback information. This is performed, for example, by translating the signal strength information into standardized values. Also, MAC-specific events are grouped into event categories, that is, successful and unsuccessful data or control packet transmissions are accounted for independently. The normalized feedback is provided via the transaction summary described below.

As understood by one skilled in the art, link adaptation algorithms that can be used in conjunction with the hardware abstraction layer 218 (See FIG. 4) are based on measured success rates. In such algorithms, the expected success rate can depend on external factors such as MAC specificities or the size of the network neighborhood if necessary. Examples of link adaptation schemes using this hardware abstraction layer are described in a U.S. patent application publication no. US-2006-0268787-A1 of Guenael Strutt et al. entitled "Method and System for Controlling the Transmission Power of at Least One Node in a Wireless Network, published on Nov. 30, 2006, and in a U.S. patent application of Guenael Strutt et al. entitled "An Adaptive Rate Selection Algorithm For Wireless Systems", Ser. No. 11/166,578, filed on Jun. 24, 2005, the entire content of both are incorporated herein by reference.

On the other hand, the techniques according to the embodiments of the present invention described herein normalize feedback information from the physical layer in conjunction with an overhead table to determine a metric while limiting computational complexity.

Transaction Summary

As can be appreciated by one skilled in the art, most nodes 102, 106 and 107 collect transmission and reception statistics. Such statistics can be collected, compiled and analyzed by, for example, the controller 112 of a node and its associated hardware. The fields that are described herein do not necessarily have to be provided in all of the statistics. That is, if a particular piece of information is missing, the routing protocol will be able to process the data provided that specific default values are used.

Values that describe a transmission attempt include absolute parameters specified by the transmitter, such as data rate, transmit power, and frame length. They may also include measurements taken by a receiver node, such as received power level, bit error rate, or signal quality. Measurements made at the receiver node may be relayed back to the transmitter node through acknowledgement messages. Such relayed measurements are referred to as "informed" measurements.

Transmission and reception statistics perform several critical functions, particularly in link adaptation and link quality estimation. Those functions include the determination of future data rates, the determination link quality/routing metrics, and the determination of transmit powers. As can be appreciated from the above, the link adaptation and link quality estimation are independent of the parameters of the physical layers. Also, each one of these tasks uses redundant information. A particular data structure is used to collect all valuable statistics at once, namely, a Transaction Summary Report. An example of characteristics of a Transaction Summary Report are set forth below:

| Transaction Summary Report | |
|---|---|
| frameType | Control or Message |
| frameSize | Frame size (Bytes) |
| txFailCount | Number of failures for this frame/rate/power |
| txSuccessCount | Number of successes for this frame/rate/power |
| txRate | Transmitted Data Rate (index to rate table), as combination of modulation, FEC and signaling rate |
| xPower | Transmit Power used (dBm) |
| xRSSI | Received Signal Strength Indication (dBm) |
| xSNR | Signal-to-Noise Ratio (dB) |
| xPSQ | Perceived Signal Quality |
| xNoise | Noise (dBm) |
| xBER | Bit Error Rate |

-continued

| Transaction Summary Report | |
|---|---|
| xAntenna | Antenna configuration |
| xChannel | Code/frequency channel or code/frequency combination |
| xSlot | Time-slot or time-slot combination |

When a node 102, 106 or 107 as shown in FIG. 1 transmits or receives data, the integration operations as shown in FIG. 4 provide feedback on the results to drive the link evaluation system. These results are provided using one or more transaction summary objects. The controller 112 and its related hardware can generate the transaction summary report at any particular node 102, 106 and 107.

As discussed below, both the Transmit and Receive feedback paths provide for multiple transaction summary objects in an array. Multiple transactions may be used to describe the control and message transactions corresponding to a single packet reception or transmission. They may also be used to specify the individual results of each piece of a multiple-fragment packet transmission.

When Providing TRANSMIT Feedback:

The transmitter of a frame implicitly knows the parameters by which the frame was transmitted. The transmitter must therefore specify the frameType and frameSize. It must also provide the results of the transmission by counting successes and failures on the frame. The txFailCount provides an indication of the number of failed attempts of the frame at the specified rate and power. The txSuccessCount provides the number of successes. Multiple successes might be used, for example, to indicate successfully transmitted fragments of equal frame size. In any event, txSuccessCount plus txFailCount must be at least 1 for a valid transaction. The Rate and Power of the transmission may be specified explicitly or marked "INVALID" if they cannot be provided. If the radio platform and protocol provide for the transmitter to be informed of the receiver's measurements (such as feedback via an ACK frame) any known measurements may be specified in the "rx" fields. Otherwise, they should be set to INVALID. It is also noted that if multiple successes are indicated, the "rx" fields will be interpreted as an average over the given number of successes.

When Providing RECEIVE Feedback

The receiver of a frame implicitly knows the frameType and frameSize and must likewise provide these. The txFailCount is ignored, as receive failures may not be traceable to any particular transmitter and are not used in the algorithm. The txSuccessCount can indicate the number of successful receptions of the specified frame type and size, but again, the "rx" measurements will then be interpreted as averages. If known to the receiver, the txRate and txPower may be specified, but otherwise should be set to INVALID. Any measurements made by the receiver may be provided in the "rx" fields, or set to INVALID if not measured or not available.

Features of the Transaction Summary:

An example of characteristics of a transaction summary report are set forth below:

Time Independence of the Transaction Summary

If the network layer, or more specifically the link adaptation layer (depending on how the system is implemented), is physically distinguishable from the MAC/PHY layers (for example, if the network and link adaptation layers are running in a driver within the operating system of a host computer and the MAC/PHY layers are running in a peripheral device such as a PC card), then there will be delays when the feedback is provided. This will not cause convergence problems if the feedback contains the parameters that were initially provided to the physical layers at transmission. This can be performed by returning the original selected data rate with the necessary feedback (RSSI and ACK/NACK) within the transaction summary report. The advantage of this method is that feedback does not have to be instantaneous: delayed feedback will allow for the link adaptation/link quality estimation algorithms to converge just the same.

Computational Efficiency of the Transaction Summary

Figure 11:
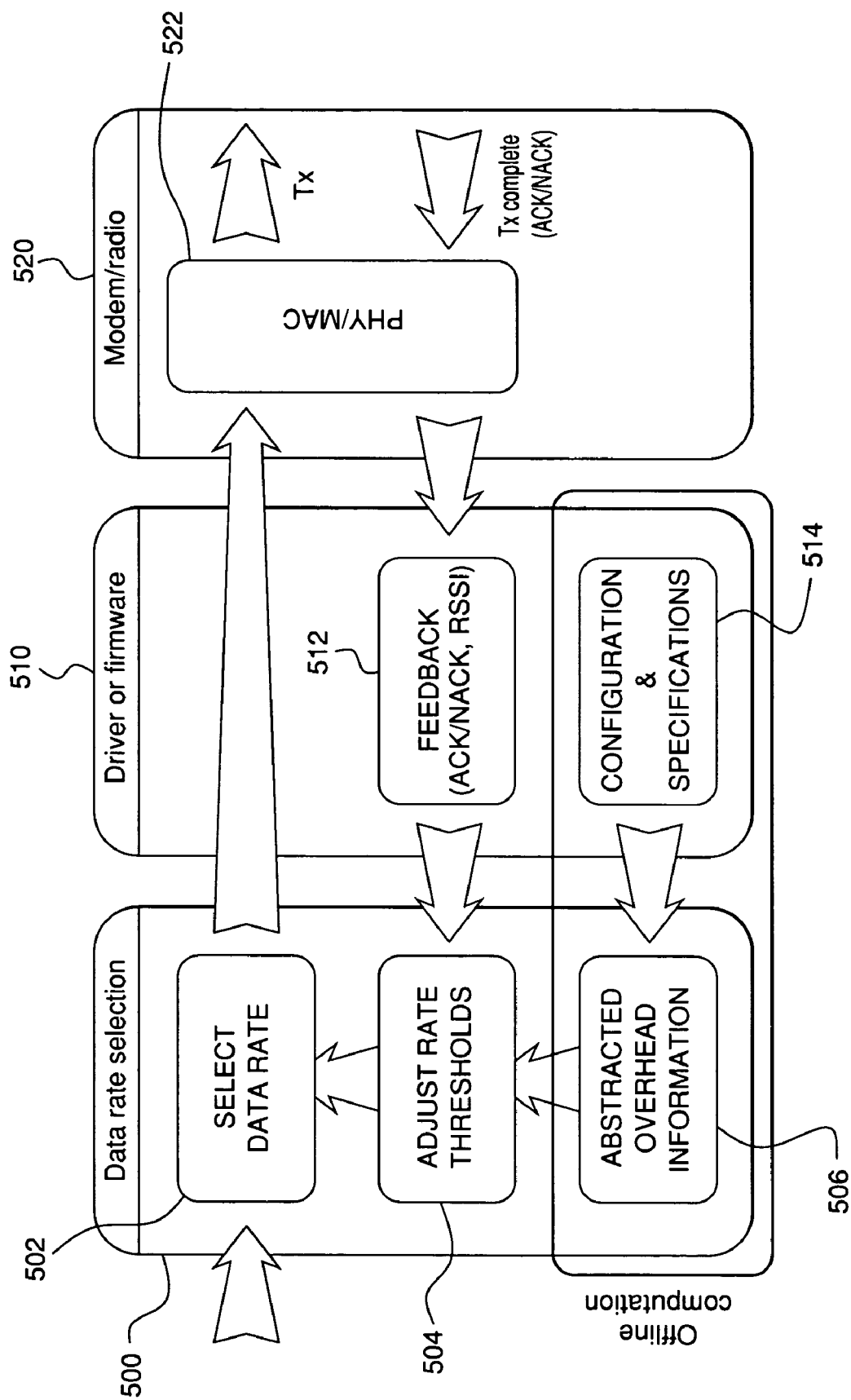
FIG. 11 is a conceptual diagram illustrating an example of the data rate selection process performed in accordance with an embodiment of the present invention.

FIG. 11 shows a block-diagram of the data rate selection process (which uses the transaction summary to adjust the data rate). The computationally-intensive calculations, such as those which determine the adjustment parameters (for example, by way of estimating the effective throughput), are performed offline via the overhead table as described above. Real-time computations are thus reduced to a minimum.

Accordingly, as shown in FIG. 11, the data rate selection process 500 is performed based on information pertaining to the driver or firmware 510 associated with the node. Such information can include configuration and specification information 514 that is computed offline as abstracted overhead information 506. The abstracted overhead information 506 can be used, for example to adjust rate thresholds in operation 504 as indicated. The rate thresholds adjusted in operation 504 will in turn affect the rate selection process in operation 502. The selected data rate is provided to the PHY/MAC layer 522 of the modem 520 (e.g., in transceiver 108 shown in FIG. 2) of the node to control the transmission of the data packet at that selected data rate. Received information, such as an ACK message, received at the modem 520 is provided as feedback information 512 to be used to adjust future rate thresholds as indicated.

Abstracted Route Metric

The principal advantage in using an abstraction layer to perform routing in a wireless channel is the ability to use a metric which takes advantage of physical layer specificities. As can be appreciated by one skilled in the art, certain modem/radio interfaces provide high data rates with considerable contention and unreliable links (i.e. 802.11b) while others provide low data rates with scheduled transmissions and reliable links (i.e. cellular-type radios). Therefore, the metric should account for such variations. For example, a metric based on end-to-end latency for a tagged packet can be used: Metric .function. (1 .fwdarw. N)=i=1 N .times. (t s, i .function. (r i , 1)+t e, i (1−PCR i .function. (r i , 1)) PCR i .function. (r i, 1)+t q, i ) where t.sub.s,i and t.sub.e,i are the parameters at node i that need to be provided by the system integrator in order for the hardware abstraction layer to perform its functions. t.sub.s,i is the total transmit time at node i as it transmits to node i+1 (including all overhead and processing time) and te .sub.i is the extra time added by node i when a transmission fails. t.sub.q,i is the queuing delay at node i—it varies according to local congestion and possibly the priority level of the node or the traffic type. The packet completion rate can be measured using the techniques described in U.S. patent application publication No. US-2004-0260808-A1 of Guenael T. Strutt entitled "A Method to Provide a Measure of Link Reliability to a Routing Protocol in an Ad Hoc Wireless Network", published on Oct. 23, 2004, the entire content of which is incorporated herein by reference. This technique is tightly integrated into the transmit summary architecture. The data rate can be the exact data rate used at the time the metric was determined or an average data rate based on a number of past samples.

All the parameters used to perform link adaptation and link quality determination are available via the transmit summary and the overhead table. Thus, the route metric is able to qualify the performance of a route depending on the nature of the physical links used to establish the route.

Multi Radio Routing Protocol

As discussed briefly above, the routing protocols for mobile ad-hoc networks are being standardized by the MANET working group in IETF. The group has currently proposed three routing protocols as Experimental RFCs, namely: Ad Hoc On Demand Distance Vector (AODV) Routing (RFC 3561) found at http://www.ietf.org/rfc/rfc3561.txt; Optimized Link State Routing Protocol (RFC 3626) found at http://www.ietf.org/rfc/rfc3626.txt; and Topology Dissemination Based on Reverse-Path Forwarding (TBRPF) (RFC 3684) found at http://www.ietf.org/rfc/rfc3684.txt, the entire content of these documents are incorporated herein by reference. These three routing protocols operate on Layer 3, that is, they use IP addresses for routing in the network and have been specified in such a way that they support multiple interfaces (i.e. they support multiple radios). For example, AODV requires the protocol stack to inform the routing layer about the particular interface (or radio) over which packets arrives, particularly the routing packets. These interfaces (or radios) are then recorded into the routing table entry for the particular node (e.g. a node 102, 106 or 107 as shown in FIG. 1), along with all other appropriate routing information. This way, the routing layer knows the particular interface (or radio) through which the destination can be reached.

Hence, any abstraction discussed herein can be readily applied to any protocol stack which uses a modified version of the aforementioned routing protocols. The modifications are needed because these routing protocols uses "hops" as the metric to compare routes while simply using "hops" as metric results in poor performance as demonstrated in an article by Douglas S. J. De Couto, Daniel Aguayo, John Bicket, and Robert Morris entitled "A High-Throughput Path Metric for Multi-Hop Wireless Routing", *In the Proceedings of the* 9th ACM International Conference on Mobile Computing and Networking (MobiCom '03), San Diego, Calif., September 2003, the entire content of which is incorporated herein by reference. On the contrary, the embodiment of the present invention described above is particularly useful to such a modified protocol as it provides a uniform interface to multiple communication devices and abstracts the physical layer parameters in order to calculate consistent route metrics.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of operation of a node for providing abstracted physical layer information to a wireless routing layer of the node, the method comprising:
   generating transaction summary information by measuring transmission and reception events at the node;
   generating the abstracted physical layer information based on the transaction summary information and overhead characteristics of the node; and
   providing the abstracted physical layer information to the wireless routing layer of the node.

2. A method as claimed in claim 1, wherein:
   the transaction summary information comprises at least one of packet size information, data rate information, signal-to-noise ratio, signal quality, noise, bit-error rate, frequency channel, time-slot, antenna information and signal strength estimation information.

3. A method as claimed in claim 1, wherein:
   the overhead characteristics comprises information pertaining to at least one of signaling time, acknowledgement (ACK) processing time, ACK time, ACK time-out, back-off time, fairness time and congestion time of the node.

4. A method as claimed in claim 1, wherein:
   the abstracted physical layer generating step generates the abstracted physical layer information for link quality estimation purposes, using overhead characteristics and measured completion rates of the node.

5. A method as claimed in claim 4, wherein:
   the link quality estimation is independent of the physical layer parameters.

6. A method as claimed in claim 1, wherein:
   the abstracted physical layer generating step generates the abstracted physical layer information for link adaptation purposes, using overhead characteristics and measured completion rates.

7. A method as claimed in claim 6, wherein:
   the link adaptation is independent of the physical layer parameters.

8. A method as claimed in claim 1, further comprising:
   creating a routing metric based on the abstracted physical layer information to enable nodes having different physical layer characteristics to communicate within the network.

9. A node as claimed in claim 1, wherein:
   the abstracted physical layer generating step generates the abstracted physical layer information for link quality estimation purposes, using overhead characteristics and measured completion rates.

10. A node as claimed in claim 9, wherein:
    the link quality estimation is independent of the physical layer parameters.

11. A node operating within a wireless communication network, the node comprising:
    a controller, operating to communicate in the wireless communication network, and operating to generate transaction summary information by measuring transmission and reception events at the node in the wireless communication network, and further operating to generate the abstracted physical layer information based on the transaction summary information and overhead characteristics of the node, and provide the abstracted physical layer information to the wireless routing layer of the node.

12. A node as claimed in claim 11, wherein:
    the transaction summary information comprises at least one of packet size information, data rate information, signal-to-noise ratio, signal quality, noise, bit-error rate, frequency channel, time-slot, antenna information and signal strength estimation information.

13. A node as claimed in claim 11, wherein:
    the overhead characteristics comprises information pertaining to at least one of signaling time, acknowledgement (ACK) processing time, ACK time, ACK time-out, back-off time, fairness time and congestion time.

14. A node as claimed in claim 11, wherein:
    the controller further operates to generate the abstracted physical layer information for link adaptation purposes, using overhead characteristics and measured completion rates.

15. A node as claimed in claim 14, wherein:
    the link adaptation is independent of the physical layer parameters used.

16. A node as claimed in claim 11, wherein:
    the controller further operates to create a routing metric based on the abstracted physical layer information to enable nodes having different physical layer characteristics to communicate within the network.

17. A method of operation of a node for enabling nodes having different physical layer characteristics to communicate within a wireless communication network, the method comprising:
    generating abstracted physical layer information based on transaction summary information and overhead characteristics relating to nodes in the wireless communication network;
    providing the abstracted physical layer information to a routing layer of the node; and
    operating the nodes to transmit data packets in accordance with parameters set forth in the abstracted physical layer information.

18. A method as claimed in claim 17, further comprising:
    collecting the transaction summary information and overhead characteristics at a routing layer of the network.

19. A method as claimed in claim 17, wherein:
    the generating step further comprise generating the abstracted physical layer based on the transaction summary and overhead characteristics, and at least one of link quality characteristics and data rate characteristics.

20. A method as claimed in claim 17, wherein:
    the operating step comprises operating the nodes to transmit data packets in accordance with parameters set forth in the abstracted physical layer information using a common wireless routing protocol.

* * * * *

UNITED STATES PATENT AND TRADEMARK OFFICE
CERTIFICATE OF CORRECTION

PATENT NO.         : 7,656,901 B2
APPLICATION NO.    : 11/200658
DATED              : February 2, 2010
INVENTOR(S)        : Strutt et al.

It is certified that error appears in the above-identified patent and that said Letters Patent is hereby corrected as shown below:

1. In Column 11, Lines 51-53, delete "Metric .function. (1 .fwdarw. N)=i=1 N .times. (t s, i .function. (r i , 1)+t e, i (1-PCR i .function. (r i , 1)) PCR i .function. (r i, 1)+t q, i)" and insert --

$$Metric(1 \to N) = \sum_{i=1}^{N}\left(\frac{t_{s,i}(r_i,l) + t_{e,i} \cdot (1 - PCR_i(r_i,l))}{PCR_i(r_i,l)} + t_{q,i}\right)$$

--, therefor.

2. In Column 11, Line 58, delete "te .sub.i" and insert -- t.sub.e,i --, therefor.

Signed and Sealed this
Tenth Day of April, 2012

David J. Kappos
*Director of the United States Patent and Trademark Office*